(12) United States Patent
EL-Jawahri et al.

(10) Patent No.: US 12,447,921 B1
(45) Date of Patent: Oct. 21, 2025

(54) SEAT BOTTOM MOUNTED AIRBAG ASSEMBLY

(71) Applicant: Ford Global Technologies, LLC, Dearborn, MI (US)

(72) Inventors: Raed Essa EL-Jawahri, Hopkinton, MA (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/885,829

(22) Filed: Sep. 16, 2024

(51) Int. Cl.
| | |
|---|---|
| *B60R 21/207* | (2006.01) |
| *B60N 2/02* | (2006.01) |
| *B60N 2/14* | (2006.01) |
| *B60R 21/231* | (2011.01) |
| *B60R 21/2338* | (2011.01) |

(52) U.S. Cl.
CPC .......... *B60R 21/207* (2013.01); *B60N 2/143* (2013.01); *B60R 21/2338* (2013.01); *B60N 2002/022* (2013.01); *B60R 2021/2078* (2013.01); *B60R 2021/23169* (2013.01); *B60R 2021/23388* (2013.01)

(58) Field of Classification Search
CPC .............. B60R 21/207; B60R 21/2338; B60R 2021/2078; B60R 2021/23169; B60R 2021/23388; B60N 2/143; B60N 2002/022
See application file for complete search history.

(56) References Cited

U.S. PATENT DOCUMENTS

| | | | |
|---|---|---|---|
| 6,170,871 B1 | 1/2001 | Goestenkors et al. | |
| 6,296,292 B1 | 10/2001 | Feldman | |
| 9,283,916 B2 | 3/2016 | Nagasawa | |
| 9,994,181 B1 * | 6/2018 | Dubaisi | B60R 21/207 |
| 10,232,814 B2 | 3/2019 | Gandhi et al. | |
| 10,525,922 B1 | 1/2020 | Lin et al. | |
| 11,214,226 B2 * | 1/2022 | Nagasawa | B60R 21/2334 |
| 11,390,235 B2 * | 7/2022 | Kim | B60R 21/233 |
| 11,618,403 B2 | 4/2023 | Kang et al. | |
| 11,760,297 B2 * | 9/2023 | Ohno | B60R 21/2338 280/728.2 |

(Continued)

FOREIGN PATENT DOCUMENTS

| | | | | |
|---|---|---|---|---|
| CN | 109109810 A1 | 1/2019 | | |
| CN | 116803768 A * | 9/2023 | ........... | B60R 21/207 |

(Continued)

OTHER PUBLICATIONS

Wu et al., "Protecting occupant in autonomous vehicle accident with rotating seat and belt airbag", Sage Journals, https://journals.sagepub.com/doi/abs/10.1177/09544070241232458.

*Primary Examiner* — Drew J Brown
(74) *Attorney, Agent, or Firm* — Frank A. MacKenzie; Brooks Kushman P.C.

(57) ABSTRACT

A seat includes a seat bottom and a seat back. The seat bottom extends in a seat-forward direction from the seat bottom. An airbag is mounted to the seat bottom and is inflatable from the seat bottom to an inflated position. The airbag in the inflated position includes a first portion extending in the seat-forward direction from the seat bottom, a second portion extending from the first portion transverse to the first portion seat-forward of the seat bottom, and a third portion extending from the second portion toward the seat bottom.

20 Claims, 7 Drawing Sheets

(56) References Cited

U.S. PATENT DOCUMENTS

| | | |
|---|---|---|
| 11,945,395 B1 | 4/2024 | Farooq et al. |
| 11,951,925 B1 | 4/2024 | Jaradi et al. |
| 11,958,431 B1 * | 4/2024 | El-Jawahri .......... B60R 21/2338 |
| 12,179,681 B2 * | 12/2024 | Ohno .................. B60R 21/2338 |
| 2008/0106080 A1 | 5/2008 | Fukawatase et al. |
| 2011/0175334 A1 | 7/2011 | Miller et al. |
| 2016/0052476 A1 | 2/2016 | Jindal et al. |
| 2016/0068131 A1 | 3/2016 | Komatsu et al. |
| 2018/0126941 A1 | 5/2018 | Faruque et al. |
| 2018/0215338 A1 | 8/2018 | Faruque et al. |
| 2019/0039551 A1 | 2/2019 | Patel et al. |
| 2019/0054882 A1 | 2/2019 | Son et al. |
| 2019/0389414 A1 | 12/2019 | Masuda et al. |
| 2020/0298984 A1 | 9/2020 | Walker |
| 2021/0155194 A1 | 5/2021 | Goswami |
| 2021/0300292 A1 | 9/2021 | Yamada et al. |
| 2022/0048458 A1 | 2/2022 | El-Jawahri et al. |
| 2022/0219636 A1 | 7/2022 | Yamazaki |
| 2024/0034264 A1 | 2/2024 | Faruque et al. |
| 2024/0083382 A1 | 3/2024 | Freisler et al. |
| 2024/0308460 A1 * | 9/2024 | Lee ....................... B60R 21/233 |

FOREIGN PATENT DOCUMENTS

| | | | |
|---|---|---|---|
| DE | 10105561 A1 * | 8/2002 | ........... B60R 21/207 |
| DE | 10311006 A1 * | 9/2004 | ........... B60R 21/231 |
| DE | 102014009620 A1 | 12/2015 | |
| DE | 102018214029 A1 | 2/2020 | |
| DE | 102023119964 A1 * | 8/2024 | ........... B60R 21/207 |
| FR | 3082473 B1 | 8/2020 | |
| JP | 2005067273 A | 3/2005 | |
| JP | 2005145381 A | 6/2005 | |
| JP | 2012121572 A | 6/2012 | |
| JP | 201443228 A | 3/2014 | |
| JP | 2015044532 A | 3/2015 | |
| JP | 2015085761 A | 5/2015 | |
| JP | 6776690 B2 | 2/2018 | |
| JP | 2019043482 A | 3/2019 | |
| JP | 6806000 B2 | 12/2020 | |
| KR | 100503298 B1 | 7/2005 | |
| WO | 2018147057 A1 | 8/2018 | |
| WO | 2018220300 A1 | 12/2018 | |

* cited by examiner

SEAT BOTTOM MOUNTED AIRBAG ASSEMBLY

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the vehicle may include seats that face each other or are free to rotate to positions facing each other.

DETAILED DESCRIPTION

A seat includes a seat bottom and a seat back. The seat bottom extends in a seat-forward direction from the seat bottom. An airbag is mounted to the seat bottom and is inflatable from the seat bottom to an inflated position. The airbag in the inflated position includes a first portion extending in the seat-forward direction from the seat bottom, a second portion extending from the first portion transverse to the first portion seat-forward of the seat bottom, and a third portion extending from the second portion toward the seat bottom.

The seat bottom may define a leg area seat forward of the seat bottom. The leg area may be configured to receive the legs of an occupant of the seat. At least a portion of the leg area may be between the seat bottom and the airbag in the inflated position. The seat bottom has a top surface. The top surface at the leg area may be higher than a top surface of the second portion of the airbag. The leg area may extend cross seat from a first end to a second end. The first end and the second end of the leg area may be between the first portion and the third portion of the airbag. The second portion of the airbag may extend cross-seat from the first end of the leg area to a second end of the leg area.

The airbag may include a baffle between the first portion and the second portion of the airbag. The airbag may include a second baffle between the second portion and the third portion of the airbag.

The seat may include a tether extending from the airbag to the seat bottom.

The seat may include an inflator supported on the seat bottom and in fluid communication with the airbag.

The seat bottom has a top surface. The second portion of the airbag includes a top surface that may be lower than the top surface of the airbag.

The seat may include a second airbag mounted to the seat bottom and inflatable from the seat bottom to an inflated position. The second airbag in the inflated position may include a first portion extending in the seat-forward direction from the seat bottom, a second portion extending from the first portion of the second airbag toward the airbag, and a third portion extending from the second portion of the second airbag toward the seat bottom.

The may include a base, the seat bottom being rotatably mounted to the base.

A vehicle includes a floor and a seat mounted to the floor. The seat includes a seat back and a seat bottom extending in a seat-forward direction from the seat bottom. The seat includes an airbag mounted to the seat bottom and inflatable from the seat bottom to an inflated position. The airbag in the inflated position includes a first portion extending in the seat-forward direction from the seat bottom, a second portion extending from the first portion transverse to the first portion seat-forward of the seat bottom, and a third portion extending from the second portion toward the seat bottom.

The seat bottom defines a leg area seat forward of the seat bottom. The leg area may be configured to receive the legs of an occupant of the seat. At least a portion of the leg area is between the seat bottom and airbag in the inflated position. The seat bottom has a top surface. The top surface at the leg area may be higher than a top surface of the second portion of the airbag. The leg area may extend cross seat from a first end to a second end. The first end and the second end of the leg area may be between the first portion and the third portion of the airbag.

The airbag may include a first baffle between the first portion and the second portion of the airbag and a second baffle between the second portion and the third portion of the airbag. The seat may include a tether extending from the airbag to the seat bottom.

The seat bottom has a top surface, and the second portion of the airbag includes a top surface that may be lower than the top surface of the airbag.

The seat may be rotatably mounted to the floor.

With reference to the Figures, wherein like numerals indicate like parts throughout the several views, a seat 12 for a vehicle 10 includes a seat bottom 14 and a seat 12 back. The seat bottom 14 extends in a seat-forward direction from the seat bottom 14. An airbag 20 is mounted to the seat bottom 14 and is inflatable from the seat bottom 14 to an inflated position. The airbag 20 in the inflated position includes a first portion 22 extending in the seat-forward direction from the seat bottom 14, a second portion 24 extending from the first portion 22 transverse to the first portion 22 seat-forward of the seat bottom 14, and a third portion 26 extending from the second portion 24 toward the seat bottom 14.

The first portion 22 positions the second portion 24 of the airbag 20 seat-forward of at least one leg of the occupant of the seat 12 in the inflated position to control the kinematics of the leg during certain vehicle impacts. Since the third portion 26 extends from the second portion 24 toward the seat bottom 14, the airbag 20 defines a pocket 28 in the inflated position and the airbag 20 extends around three sides of at least one leg of the occupant to control the kinematics of the leg during certain vehicle impacts.

Figure 1:
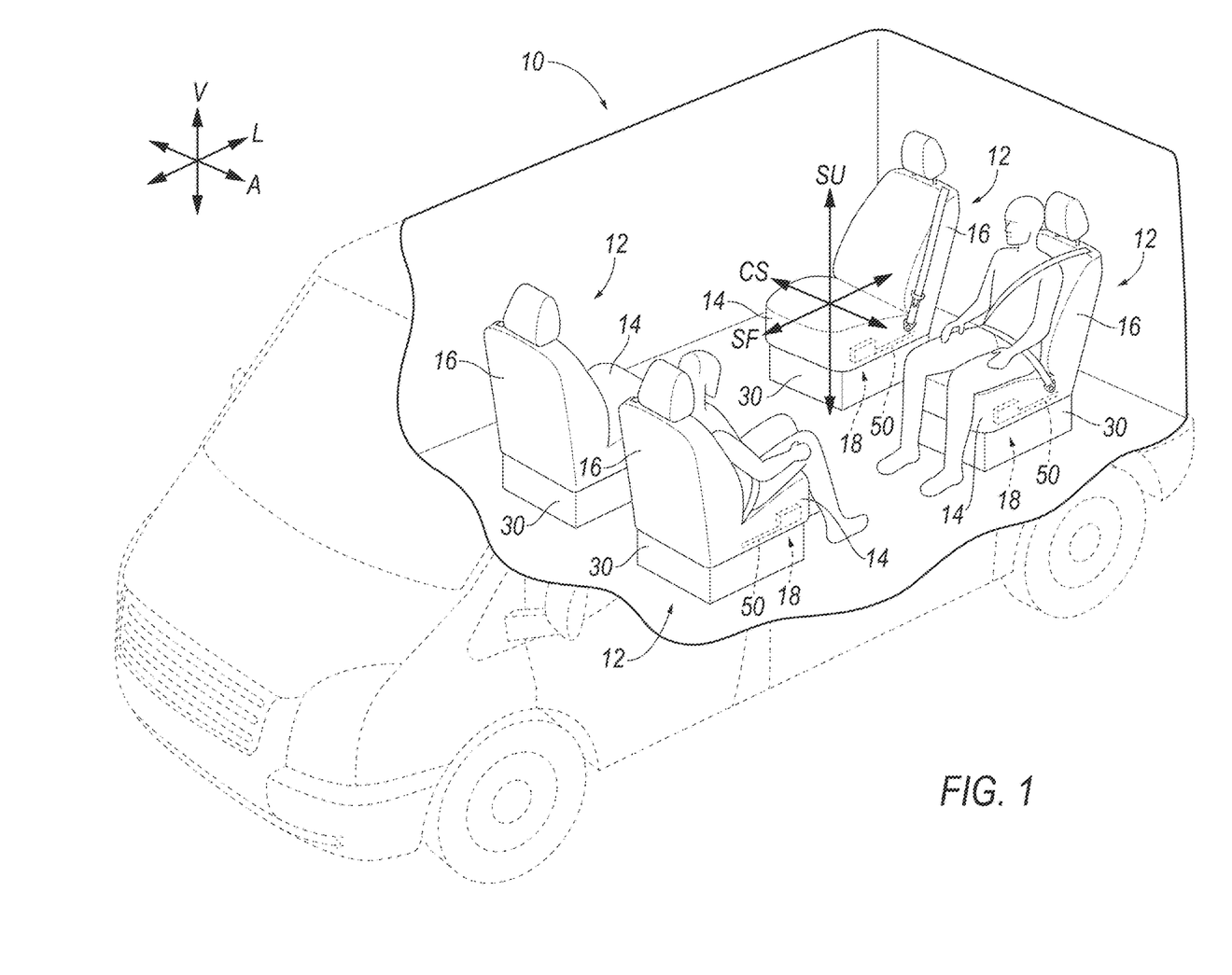
FIG. 1 is a cut-away view of a vehicle including seat assemblies with airbag assemblies in uninflated positions.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 defines an occupant cabin. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V extending through a floor and roof of the vehicle 10. The vehicle-longitudinal axis L, the vehicle-lateral axis A, and the vertical axis V are perpendicular relative to each other.

The vehicle 10 includes one or more seats 12 in the occupant cabin. The vehicle 10 may include any suitable number of seats 12. The seats 12 may be arranged in the occupant cabin in any suitable position, i.e., as front seats, rear seats, third-row seats, etc. The seat 12 may be movable relative to the floor to various positions, e.g., movable fore-and-aft and/or cross-vehicle. The seats 12 may be of any suitable type, e.g., a bucket seat. In the example shown in FIGS. 1 and 2, the vehicle 10 includes four seats 12, and each seat 12 includes at least one airbag assembly 18. In other examples, the vehicle 10 may include any suitable number of seats 12, and any one or more of the seats 12 may include one or more airbag assemblies 18.

In some examples, one or more of the seats 12 may be swivelable. In other words, the seat 12 may be selectively swiveled by the occupant of the seat 12 to different facing positions. Specifically, each seat 12 is rotatably mounted to the floor and may rotate about a seat-upright axis SU that extends through the roof and the floor. For example, the seats 12 may rotate between a forward-facing position, a rearward-facing position, a rightward-facing position, a leftward-facing position, and/or positions therebetween. In the forward-facing position, an occupant of the seat 12 faces a front dash, and in the rearward-facing position, an occupant of the seat 12 faces in an opposite direction toward the rear of the occupant cabin. In the example shown in FIGS. 1 and 2, two of the seats 12 are in the forward-facing position and two of the seats 12 are in the rearward-facing position. The seats 12 may rotate completely, i.e., 360°, about the vertical axis SU. The seats 12 may rotate between fixed positions, e.g., the forward-facing position and the rearward-facing position, or may be rotatable to an infinite number of positions. In some examples, one or more of the seats 12 may be fixed in a single facing direction.

In examples in which the seat 12 is swivelable, the seat 12 may include a base 30, and the seat bottom 14 may be rotatably mounted to the base 30. The base 30 may include, for example, a rotating track, a rotating pedestal, etc., for rotation, i.e., swiveling, of the seat bottom 14 relative to the base 30. The base 30 may be fixed to the floor, e.g., directly fixed to the floor.

The seat 12 defines a seat-forward direction. The seat-forward direction extends forward relative to the seat 12. For example, the seat-forward direction may extend from a rear of the seat 12 to a front of the seat 12 relative to an occupant of the seat 12, i.e., the occupant of the seat 12 faces in the seat-forward direction when properly seated in the seat 12. The seat bottom 14 extends from the seatback 16 in the seat-forward direction. The seat 12 defines a cross-seat axis CS and a seat-upright axis SU. A cross-seat direction extends in parallel with the cross-seat axis CS. The seat-forward axis, the cross-seat axis CS, and the seat-upright axis SU are perpendicular to each other. The forward-facing axis is parallel with the vehicle-longitudinal axis L when the seat 12 is forward facing and when the seat 12 is rearward facing, the cross-seat axis CS is parallel with the cross-vehicle axis when the seat 12 is forward facing and when the seat 12 is rearward facing, and the seat-upright axis SU extends through the vehicle 10 floor and the vehicle 10 roof when the seatback 16 is in an upright position.

The seat 12 includes a first side 32 and a second side 34. The first side 32 is spaced from the second side 34 along the cross-seat axis CS. The numerical adjectives "first" and "second" are used herein as identifiers and do not indicate order or importance. In the example shown in the Figures, when the seat 12 is in a forward-facing position, the second side 34 of the seat 12 is vehicle-inboard of the first side 32 of the seat 12, and the first side 32 of the seat 12 is vehicle-outboard of the second side 34 of the seat 12. When the seat 12 is in a rearward-facing position, the first side 32 of the seat 12 is vehicle-inboard of the second side 34 of the seat 12, and the second side 34 of the seat 12 is vehicle-outboard of the inboard side of the seat 12.

The seat bottom 14 extends from the seatback 16 in the seat-forward direction. The seatback 16 may be supported by the seat bottom 14 and may be stationary or movable relative to the seat bottom 14. The seatback 16 and the seat bottom 14 may be adjustable in multiple degrees of freedom to vary recline angle of the seatback 16. Specifically, the seatback 16 and the seat bottom 14 may themselves be adjustable, in other words, adjustable components within the seatback 16 and/or the seat bottom 14, and/or may be adjustable relative to each other.

The seat bottom 14 and the seatback 16 each include a frame (not numbered) and a covering (not numbered) supported on the frame. The frame may include tubes, beams, etc. The seatback 16 frame may be of any suitable material such as plastic (e.g., carbon fiber reinforced plastic (CFRP), glass fiber-reinforced semi-finished thermoplastic composite (organosheet), etc.) and/or metal (e.g., steel, aluminum, etc.). The frame of the seat bottom 14 includes a first side at the first side 32 of the seat 12 and a second side at the second side 34 of the seat 12.

The covering of the seat may include upholstery and padding. The upholstery may be cloth, leather, faux leather, or any other suitable material. The upholstery may be stitched in panels around the frame. The padding may be between the covering and the frame and may be foam or any other suitable material.

The seat 12, specifically the seatback 16 and the seat bottom 14, define an occupant-seating area 36. The occupant-seating area 36 is the space occupied by an occupant properly seated on the seat 12. The occupant-seating area 36 is seat-forward of the seatback 16 and above the seat bottom 14. The occupant-seating area 36 is on a front side of the seatback 16.

The occupant-seating area 36 includes a leg area 38 seat forward of the seat bottom 14. The seat bottom 14 defines the leg area 38. In other words, a seat-forward surface of the seat bottom 14 bounds the leg area 38. The leg area 38 is configured to receive the legs of an occupant of the seat 12 when the occupant is properly seated in the seat 12.

The seatback 16 may have bolsters 40 on opposite sides of the occupant-seating area 36. One bolster 40 is on the inboard side of the seat 12 and one bolster 40 is on the outboard side of the seat 12, and specifically, one bolster 40 may be on the inboard side of the frame of the seatback 16 and the other bolster 40 may be on the outboard side of the frame of the seatback 16. The bolsters 40 are elongated, and specifically, are elongated in a generally upright direction when the seatback 16 is in a generally upright position. The bolsters 40 define cross-seat boundaries of the seatback 16, i.e., the seatback 16 terminates at the bolsters 40. The bolsters 40 may extend in a seat-forward direction relative to the occupant-seating area 36, i.e., on opposite sides of the torso and shoulders of an occupant seated on the seat 12.

The vehicle 10 includes a seatbelt assembly for each seat 12. The seatbelt assembly may be a three-point harness, meaning that the webbing is attached at three points around the occupant when fastened: the anchor, the seatbelt retractor, and the buckle. The seatbelt assembly may, in other examples, include another arrangement of attachment points.

The airbag assembly 18 includes the airbag 20. The airbag assembly 18 includes an inflator 42 and may include a housing. The inflator 42 inflates the airbag 20 to the inflated position, as described further below.

The airbag 20 is mounted to the seat bottom 14. Specifically, the airbag 20 is mounted to the frame of the seat bottom 14. The airbag 20 is supported by the seat bottom 14 in the uninflated position and the in the inflated position, i.e., the weight of the airbag 20 is borne by the seat bottom 14, e.g., the frame of the seat bottom 14, in the uninflated position and in the inflated position. In examples including the housing, the housing houses the airbag 20 in the uninflated position and supports the airbag 20 in the inflated position. The airbag 20 may be rolled and/or folded to fit within the housing in the uninflated position. The housing may be of any suitable material, e.g., a rigid polymer, a metal, a composite, or a combination of rigid materials. The airbag 20 housing may, for example, include clips, threaded fasteners, etc., for attaching the housing to the floor. In other examples, the airbag 20 may be mounted directly to the frame of the seat bottom 14, i.e., without a housing. In such an example, the airbag 20 may be rolled and/or folded beneath the cover of the seat bottom 14.

The airbag 20 is inflatable from the seat bottom 14 to the inflated position. The cover of the seat bottom 14 may include a tear seam through which the airbag 20 breaks when the airbag 20 is inflated from the uninflated position to the inflated position.

As set forth above, the airbag 20 in the inflated position includes the first portion 22, the second portion 24, and the third portion 26. In the inflated position, the first portion 22 is supported by the seat bottom 14, the second portion 24 is supported by the first portion 22, and the third portion 26 is supported by the second portion 24. In other words, the weight of the first portion 22 is borne by the seat bottom 14, the weight of the second portion 24 is borne by the first portion 22, and the weight of the third portion 26 is borne by second portion 24. The second portion 24 is supported by the seat 12 through the first portion 22. The third portion 26 is supported by the seat 12 through the first portion 22 and the second portion 24.

In some examples, the inflator 42 inflates the first portion 22 directly. In other words, inflation medium flows from the inflator 42 to the first portion 22 and flows to the second portion 24 and the third portion 26 through the first portion 22. Specifically, in such an example, the inflation medium flows from the inflator 42 to the first portion 22, from the first portion 22 to the second portion 24, and from the second portion 24 to the third portion 26.

The first portion 22, the second portion 24, and the third portion 26 are in fluid communication with each other. Specifically, the airbag 20 has an inflation chamber that extends through the first portion 22, the second portion 24, and the third portion 26. The inflator 42 provides inflation medium to the first portion 22, and the inflation medium flows from the first portion 22 to the second portion 24 and from the second portion 24 to the third portion 26.

The airbag 20 may include one or more baffles 44 between the portions 22, 24, 26. For example, airbag 20 may include a baffle 44 between the first portion 22 and the second portion 24 and/or a baffle 44 between the second portion 24 and the third portion 26. In the example shown in the Figures, the airbag 20 includes a first baffle 44 between the first portion 22 and the second portion 24 and a second baffle 44 between the second portion 24 and the third portion 26.

The baffle 44 is designed to allow a restricted amount of flow of inflation medium through the baffle 44. The baffle 44 is designed so that the upstream portion of the airbag 20 inflates to the inflated position before the downstream portion reaches the inflated position. Specifically, the baffle 44 allows less inflation medium therethrough than the production of inflation medium by the inflator 42. In other words, the flowrate of inflation medium through the baffle 44 is less than the flowrate of inflation the inflator 42. In the example shown in the Figures, as the inflator 42 provides inflation medium to the first portion 22 of the airbag 20, the first baffle 44 allows less inflation medium to flow through the first baffle 44 than the inflator 42 provides to the first portion 22. Accordingly, the first portion 22 reaches the inflated position, i.e., is fully inflated, before the second portion 24 reaches the inflated position. Specifically, when the first portion 22 reaches the inflated position, the second portion 24 is partially inflated and thereafter continues to inflate to the inflated position. Similarly, since the inflation medium must past through both the first baffle 44 and the second baffle 44 to reach the third portion 26, the second portion 24 inflates to the inflated position, i.e., is fully inflated, before the third portion 26 inflates to the inflated position. Specifically, when the second portion 24 reaches the inflated position, the third portion 26 is partially inflated and thereafter continues to inflate to the inflated position. In some examples, the second baffle 44 allows less inflation medium therethrough than does the first baffle 44.

Since the first portion 22, the second portion 24, and the third portion 26 of the airbag 20 sequentially inflate to the inflated position, the airbag 20 inflates around the legs of the occupant in the leg area 38 of the seat 12. Specifically, the inflation of the first portion 22 to the inflated position spaces the second portion 24 and the third portion 26 from the front end of the seat bottom 14 so that the second portion 24 and the third portion 26 are forward of the legs of the occupant in the leg area 38 in the seat-forward direction. When the first portion 22 is in the inflated position and the second portion 24 continues to inflate, the second airbag 20 extends in the cross-seat direction seat-forward of the leg area 38 of the seat 12 and at least one leg of the occupant properly seated in the seat 12. The inflation of the second portion 24 to the inflated position moves the third portion 26 in the cross-seat direction. When the second portion 24 is in the inflated position and the third portion 26 continues to inflate, the third portion 26 extends seat-rearward. The first portion 22, the second portion 24, and the third portion 26 in the inflated position create a pocket 28 that receives at least one leg of the occupant.

Each baffle 44 may include a panel with openings. The panel is between the adjacent portions of the airbag 20 and the openings extend from one portion to the other portion of the airbag 20. The openings may have any suitable size and shape, e.g., may be holes of any shape, slits, etc. The number, size, and location of the openings may be designed based on empirical data to achieve the desired flowrate therethrough.

The panel of the baffle 44 is fixed to an exterior wall of the airbag 20. In some examples, including the examples shown in the Figures, the panel has an outer periphery, and the entire outer periphery is connected to the airbag 20. In such examples, no gap exists between the exterior wall of the airbag 20 and the panel of the baffle 44 such that flow through the baffle 44 occurs only at the openings. In other examples, a gap between the exterior wall of the airbag 20 and the panel of the baffle 44 may allow for flow therebetween as part of the design of the overall flow characteristic of the baffle 44. The baffle 44 may be connected to the exterior wall of the airbag 20 in any suitable fashion, e.g., stitching, welding, adhesive, etc. The baffle 44 may be fabric. In some examples, the baffle 44 may be of the same material type as the exterior wall of the airbag 20.

The first portion 22 of the airbag 20 extends in the seat-forward direction from the seat bottom 14 in the inflated position. The first portion 22 may be elongated in the seat-forward direction in the inflated position, i.e., the longest dimension of the first portion 22 may be in the seat-forward direction.

The second portion 24 extends from the first portion 22 transverse to the first portion 22 in the inflated position. In the example shown in the Figures the second portion 24 extends perpendicular to the first portion 22 in a cross-seat direction, i.e., a direction parallel to the cross-seat axis CS. The second portion 24 may be elongated along the cross-seat direction. The second portion 24 is seat-forward of the seat bottom 14 in the inflated position. Specifically, as set forth below, the second portion 24 is spaced from a front end of the seat bottom 14.

The third portion 26 is spaced from the first portion 22 in the cross-seat direction and extends from the second portion 24 toward the seat bottom 14 in the inflated position. The third portion 26 extends in the vehicle-rearward direction from the second portion 24 toward the seat bottom 14. In the example shown in the Figures the third portion 26 extends perpendicular to the second portion 24 in a seat-rearward direction. The second portion 24 may be elongated along the cross-seat direction.

The second portion 24 of the airbag 20 has a top surface 46 that is lower than the seat bottom 14 so that the second portion 24 of the airbag 20 is lower than the knees of an occupant properly seated in the seat 12 and to control the kinematics of the lower legs of the occupant. Specifically, the seat bottom 14 has a top surface 48, and the top surface 48 of the seat bottom 14 at the leg area 38, i.e., at a front side of the seat bottom 14, is higher than the top surface 46 of the second portion 24 of the airbag 20.

The seat 12 may include a tether 50 extending from the airbag 20 to the seat bottom 14, e.g., the frame of the seat bottom 14. The tether 50 is fixed to the seat bottom 14, e.g., to the frame of the seat bottom 14, and is fixed to the airbag 20.

The tether 50 is connected to the airbag 20 and the frame of the seat bottom 14 at locations to resist upward movement of the second portion 24 of the airbag 20. In the inflated position, the tether 50 extends seat 12 rearward from the airbag 20 to the seat bottom 14. The tether 50, for example, may extend from the airbag 20 to a rear half of the seat bottom 14. In other words, in such an example, the tether 50 is fixed to the frame of the seat bottom 14 at a location seat-rearward of a cross-seat midline. In the inflated position, the tether 50 may be fixed to a bottom half of the airbag 20. For example, the tether 50 may be fixed to the bottom half of the second portion 24 of the airbag 20. In another example, the tether 50 may be fixed to the first portion 22, e.g., a bottom half of the first portion 22. In such an example, the tether 50 may be fixed to a seat-forward half of the first portion 22 in the inflated position.

At least a portion of the leg area 38 is between the seat bottom 14 and airbag 20 in inflated position. The first portion 22, the second portion 24, and the third portion 26 in the inflated position create pocket 28 that receives at least one leg of the occupant. For example, in the example shown in FIGS. 2-3, the pocket 28 receives one leg of the occupant. In the example shown in FIGS. 4-5, the pocket 28 receives both legs of the occupant.

Figure 2:
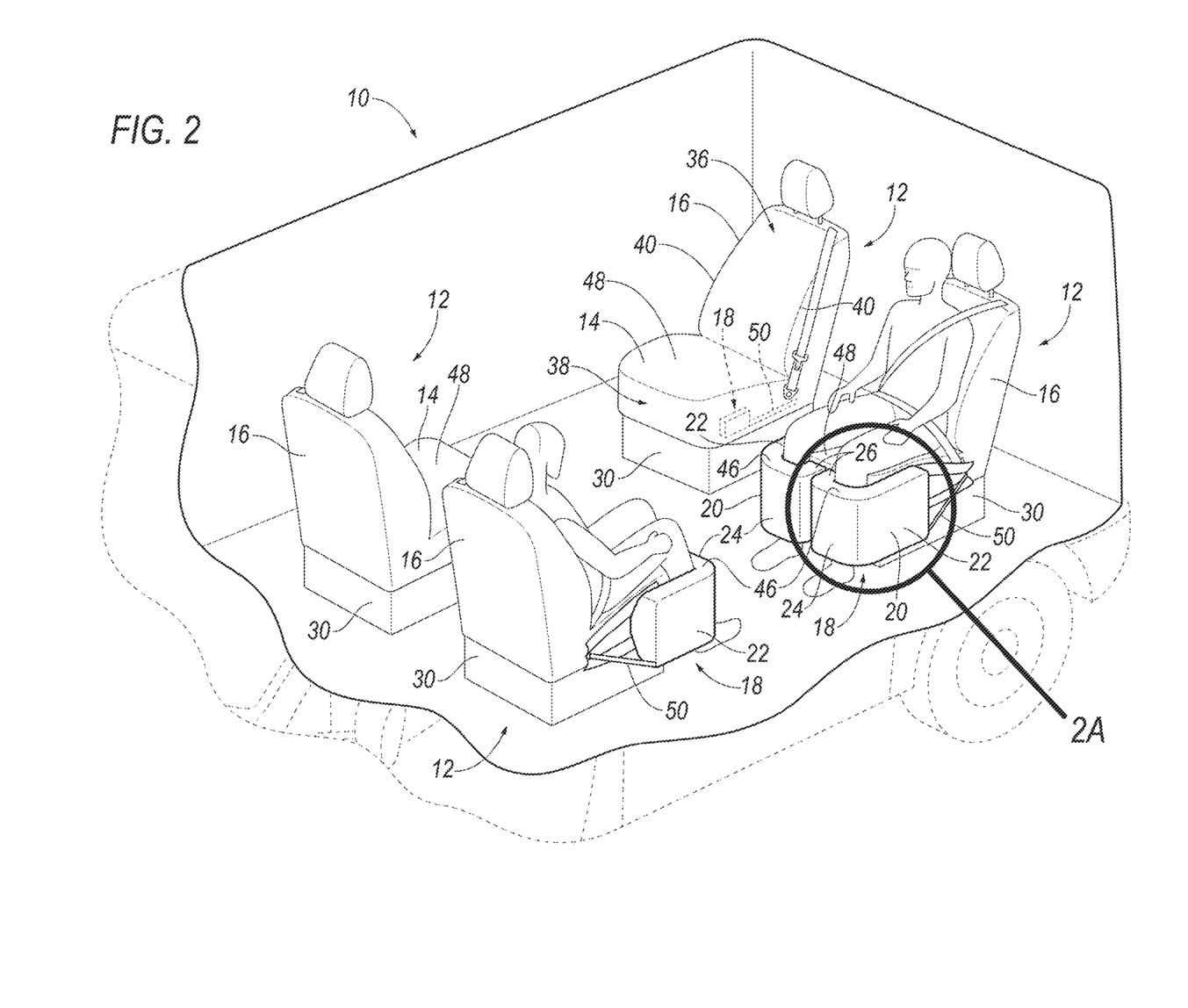
FIG. 2 is a cut cut-away view of a vehicle including seat assemblies with an example of airbag assemblies in inflated positions.
Figure 2A:
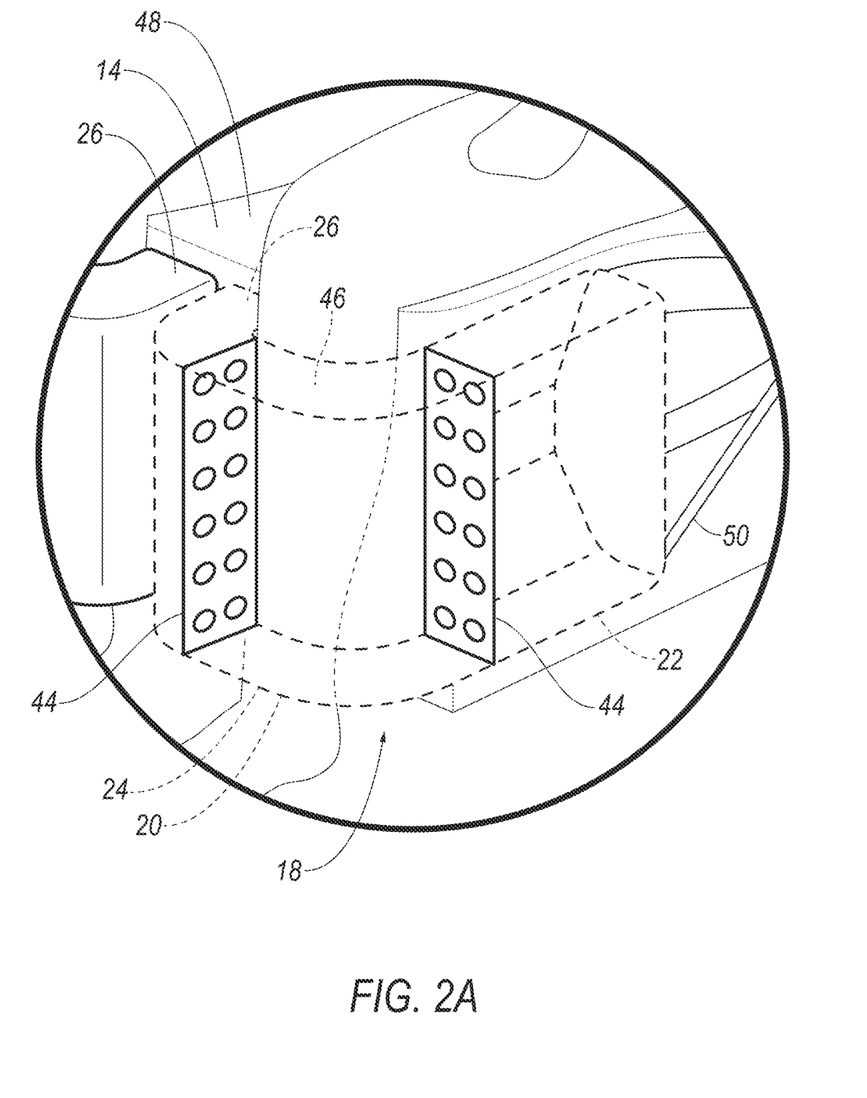
FIG. 2A is a magnified view of FIG. 2.
Figure 3:
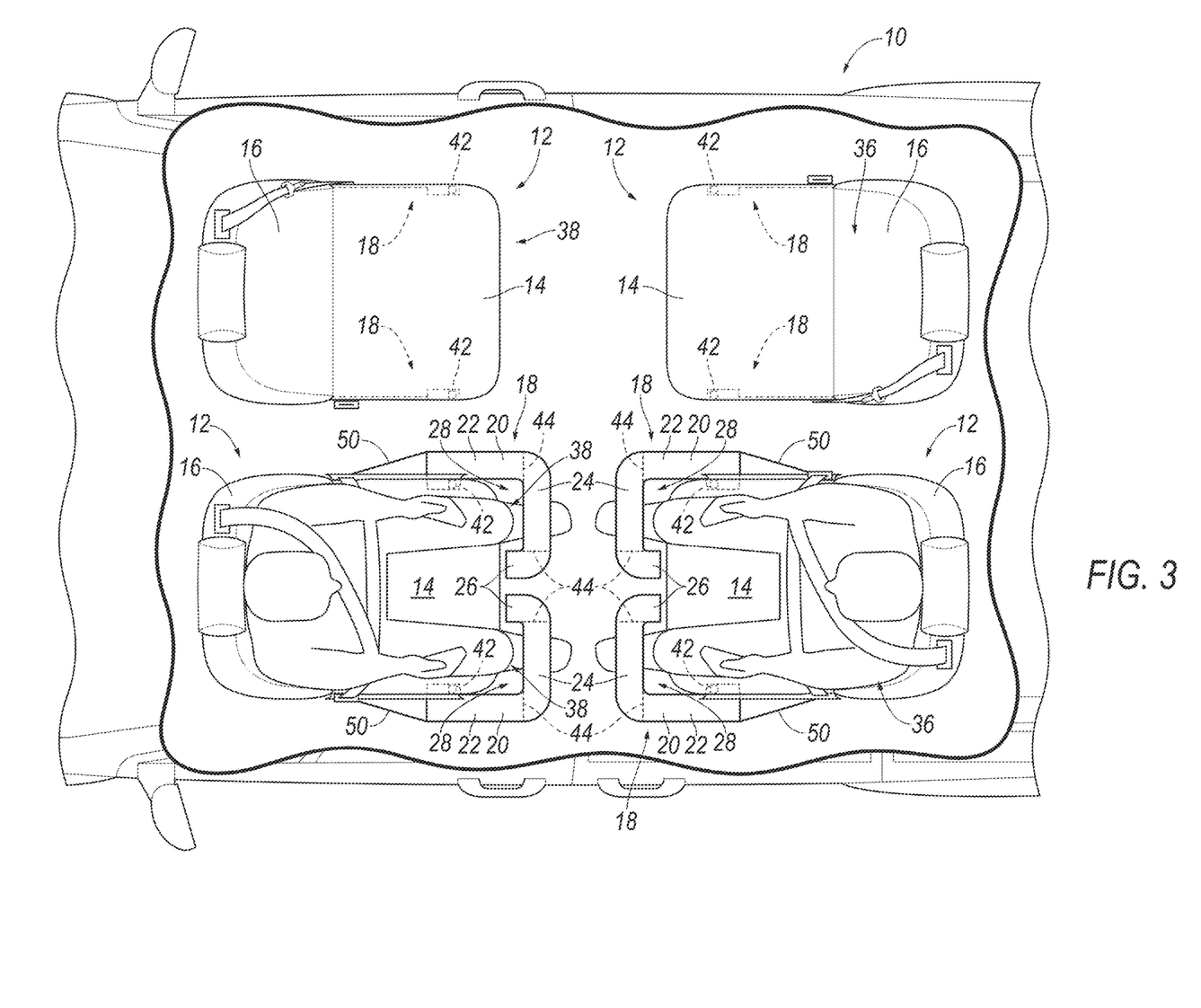
FIG. 3 is a plan view of an interior of the vehicle with the example airbag assemblies of FIG. 2

With reference to the example shown in FIGS. 2-3, each seat 12 includes two airbag assemblies 18, namely a first airbag assembly 18 and a second airbag assembly 18. Both airbag assemblies 18 are mounted to the seat bottom 14 and are inflatable from the seat bottom 14 to an inflated position. In such an example, in the inflated positions, the second portion 24 of the airbag 20 of the first airbag assembly 18 extends from the first portion 22 of the airbag 20 of the first airbag assembly 18 toward the second portion 24 of the airbag 20 of the second airbag assembly 18. Likewise, in the inflated positions, the second portion 24 of the airbag 20 of the second airbag assembly 18 extends from the first portion 22 of the airbag 20 of the second airbag assembly 18 toward the second portion 24 of the airbag 20 of the first airbag assembly 18.

With continued reference to FIGS. 2-3, the third portion 26 of both airbag assemblies 18 extends from the respective second portion 24 toward the seat bottom 14. Specifically, the third portions 26 extend between the legs of the occupant. As set forth above, each airbag assembly 18 defines one pocket 28 that receives one leg of the occupant.

Figure 4:
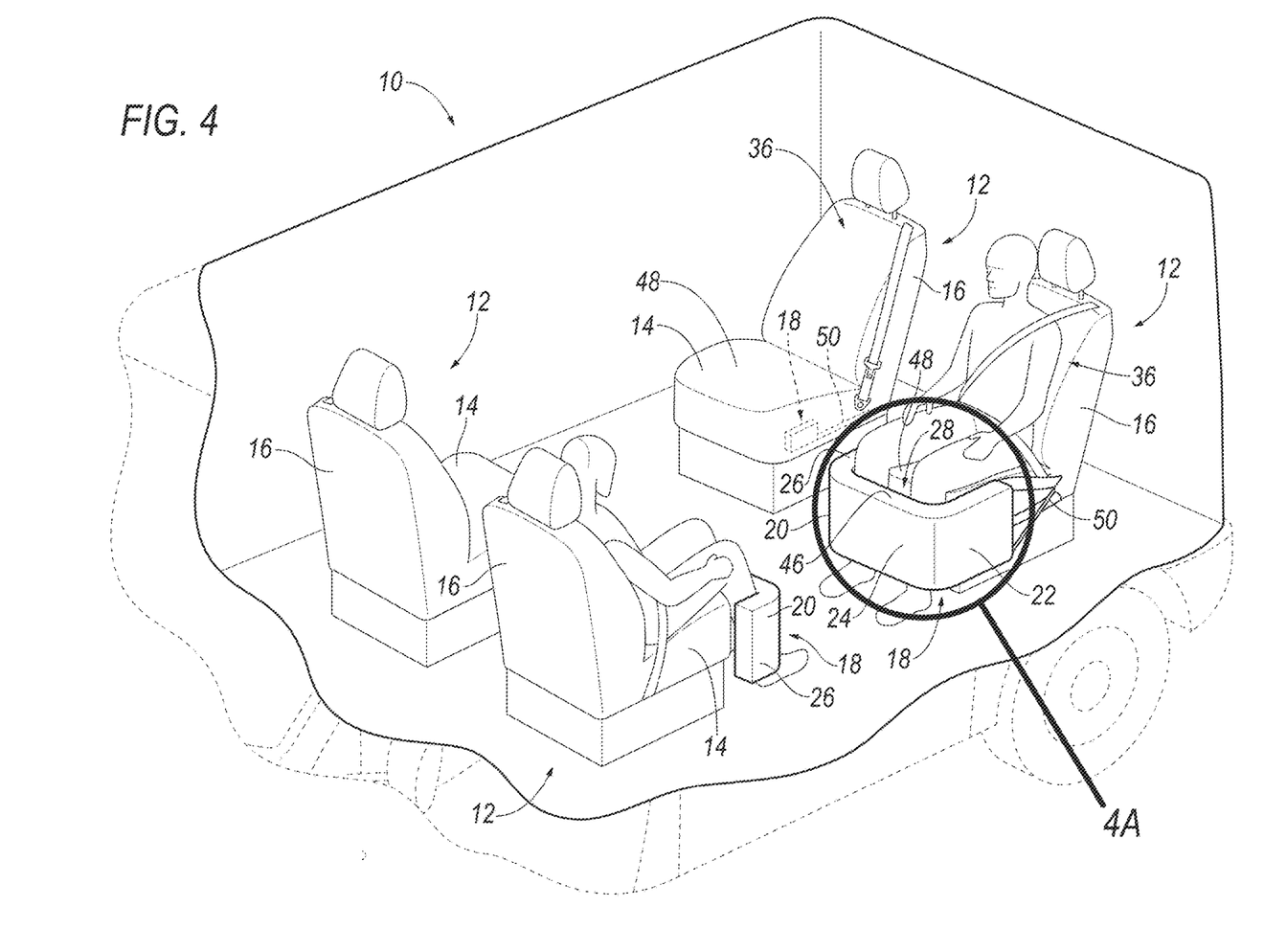
FIG. 4 is a cut cut-away view of a vehicle including seat assemblies with another example of airbag assemblies in inflated positions.
Figure 4A:
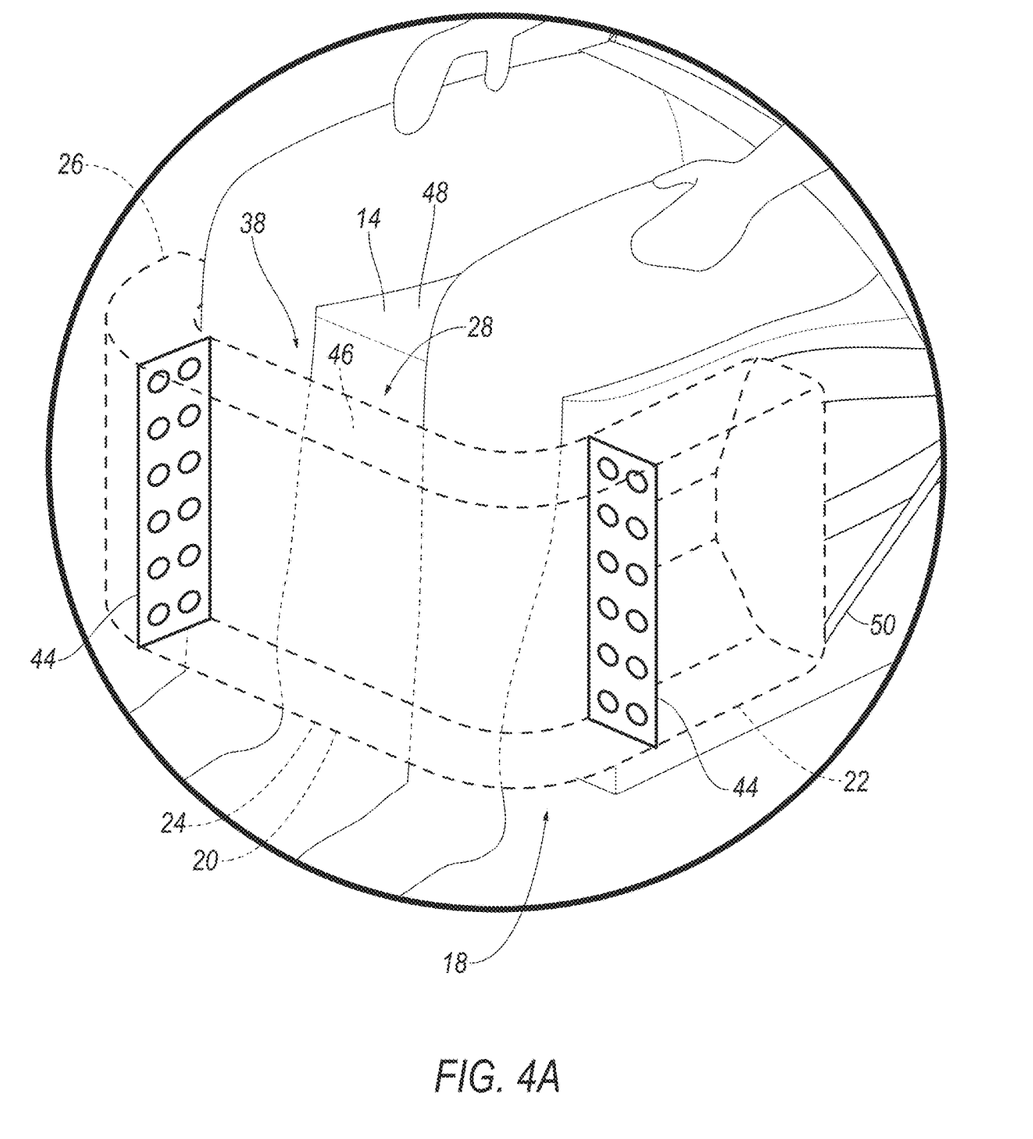
FIG. 4A is a magnified view of FIG. 4.
Figure 5:
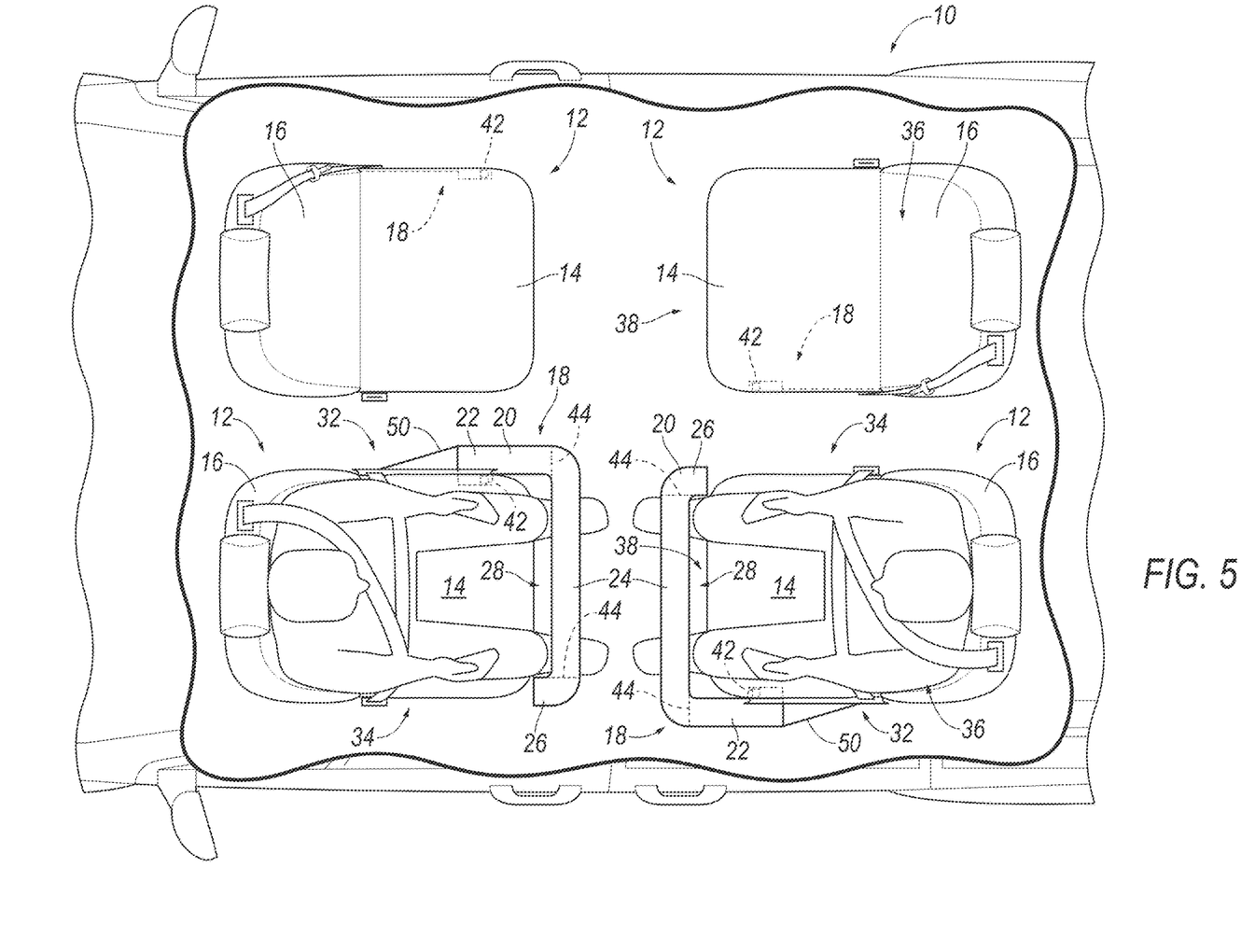
FIG. 5 is a plan view of an interior of the vehicle with the example airbag assemblies of FIG. 4.

In the example shown in FIGS. 4-5, the leg area 38 extends cross seat 12 from a first end to a second end, and the first end and the second end of the leg area 38 are both between the first portion 22 and the third portion 26 of the airbag 20. Specifically, the second portion 24 of the airbag 20 extends cross-seat from the first end of the leg area 38 to a second end of the leg area 38. In such an example, the airbag assembly 18 defines one pocket 28 that receives both legs of the occupant.

The airbag 20 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 42 is in fluid communication with the airbag 20. The inflator 42 expands the airbag 20 with inflation medium, such as a gas, to move the airbag 20 from the uninflated position to the inflated position. In some examples, the inflator 42 may be fixed to (e.g., with threaded fasteners, straps, etc.) and supported by the frame of the seat bottom 14, as shown in the example in the Figures. In such an example, the inflator 42 may be, for example, at least partially in the inflation chamber to deliver inflation medium directly to the inflation chamber or may be connected to the inflation chamber through fill tubes, diffusers, etc. The inflator 42 may be, for example, a pyrotechnic inflator 42 that ignites a chemical reaction to generate the inflation medium, a stored gas inflator 42 that releases (e.g., by a pyrotechnic valve) stored gas as the inflation medium, or a hybrid.

The vehicle 10 may include a computer having a processor and a memory storing instructions executable by the processor to deploy the airbag 20. The computer may be, for example, a restraints control module. Use of "in response to" and "based on" herein indicates a causal relationship, not merely a temporal relationship.

The vehicle 10 computer includes a processor and a memory such as are known. The memory includes one or more forms of computer readable media, and stores instructions executable by the vehicle 10 computer for performing various operations, including as disclosed herein.

Via a vehicle network, the computer may transmit messages to various devices in the vehicle 10 and/or receive messages (e.g., CAN messages) from the various devices, e.g., sensors, the actuator, the inflator 42, a human machine interface (HMI), etc. Alternatively or additionally, in cases where the computer includes a plurality of devices, the vehicle communication network may be used for communications between devices represented as the computer in this disclosure. Further, as mentioned below, various controllers and/or sensors may provide data to the computer via the vehicle 10 communication network. The communication network can include a bus in the vehicle 10 such as a controller area network (CAN) or the like, and/or other wired and/or wireless mechanisms.

The computer is a microprocessor-based controller implemented via circuits, chips, or other electronic components. The computer includes a processor and a memory. The memory includes one or more forms of computer readable media, and stores instructions executable by the computer for performing various operations, including as disclosed herein. The computer may be programmed to execute operations disclosed herein. The memory stores instructions executable by the processor to execute the operations disclosed herein and electronically stores data and/or databases. For example, the computer may include one or more dedicated electronic circuit including an ASIC (Application Specific Integrated Circuit) that is manufactured for a particular operation. In another example, the computer may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer may be a set of computers communicating with one another.

The vehicle 10 may include at least one impact sensor for sensing certain vehicle impacts (e.g., impacts of a certain magnitude, direction, etc.), and the computer in communication with the impact sensor, the actuator of the deployment assembly, and the inflator 42. The computer may activate the inflator 42, e.g., provide an impulse to a pyrotechnic charge of the inflator 42 when the impact sensor senses certain vehicle impacts. The impact sensor may be configured to sense certain vehicle impacts prior to impact, i.e., pre-impact sensing. The impact sensor may be in communication with the computer. The impact sensor is configured to detect certain vehicle impacts. In other words, a "certain vehicle impact" is an impact of the type and/or magnitude for which inflation of the airbag 20 is designed i.e., "certain" indicates the type and/or magnitude of the impact. The type and/or magnitude of such "certain vehicle impacts" may be pre-stored in the computer, e.g., a restraints control module and/or a body control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor may be located at numerous points in or on the vehicle 10.

The vehicle 10 may include an occupant detection system including at least one occupancy sensor. One or more occupant detection sensor may determine whether an occupant is seated in the seat 12, i.e., may be configured to at least detect occupancy of the seat 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
   a seat bottom;
   a seat back, the seat bottom extending in a seat-forward direction from the seat back; and
   an airbag mounted to the seat bottom and inflatable from the seat bottom to an inflated position;
   the airbag in the inflated position including a first portion extending in the seat-forward direction from the seat bottom, a second portion extending from the first portion transverse to the first portion seat-forward of the seat bottom, and a third portion extending from the second portion toward the seat bottom; and
   the seat bottom having a top surface, and the second portion of the airbag including a top surface lower than the top surface of the seat.

2. The seat as set forth in claim 1, wherein the seat bottom defines a leg area seat-forward of the seat bottom, the leg area being configured to receive the legs of an occupant of the seat, at least a portion of the leg area being between the seat bottom and the airbag in the inflated position.

3. The seat as set forth in claim 2, wherein the leg area extends cross seat from a first end to a second end, the first end and the second end of the leg area being between the first portion and the third portion of the airbag.

4. The seat as set forth in claim 3, wherein the second portion of the airbag extends cross seat from the first end of the leg area to a second end of the leg area.

5. The seat as set forth in claim 1, wherein the airbag includes a baffle between the first portion and the second portion of the airbag.

6. The seat as set forth in claim 5, wherein the airbag includes a second baffle between the second portion and the third portion of the airbag.

7. The seat as set forth in claim 1, further comprising a tether extending from the airbag to the seat bottom.

8. The seat as set forth in claim 1, further comprising an inflator supported on the seat bottom and in fluid communication with the airbag.

9. The seat as set forth in claim 1, further comprising a second airbag mounted to the seat bottom and inflatable from the seat bottom to an inflated position, the second airbag in the inflated position including a first portion extending in the seat-forward direction from the seat bottom, a second portion extending from the first portion of the second airbag toward the airbag, and a third portion extending from the second portion of the second airbag toward the seat bottom.

10. The seat as set forth in claim 1, further comprising a base, the seat bottom being rotatably mounted to the base.

11. A vehicle comprising:
a floor;
a first seat mounted to the floor; and
a second seat mounted to the floor;
the first seat and the second seat being designed to face each other;
the first seat including a seat back and a seat bottom extending in a seat-forward direction from the seat bottom;
the first seat including an airbag mounted to the seat bottom and inflatable from the seat bottom to an inflated position between the first seat and the second seat; and
the airbag in the inflated position including a first portion extending in the seat-forward direction from the seat bottom, a second portion extending from the first portion transverse to the first portion seat-forward of the seat bottom, and a third portion extending from the second portion toward the seat bottom.

12. The vehicle as set forth in claim 11, wherein the seat bottom defines a leg area seat-forward of the seat bottom, the leg area being configured to receive the legs of an occupant of the seat, at least a portion of the leg area being between the seat bottom and the second portion of the airbag in the inflated position, and the second portion of the airbag being between the first seat and the second seat.

13. The vehicle as set forth in claim 12, wherein the leg area extends cross seat from a first end to a second end, the first end and the second end of the leg area being between the first portion and the third portion of the airbag.

14. The vehicle as set forth in claim 11, wherein the airbag includes a first baffle between the first portion and the second portion of the airbag and a second baffle between the second portion and the third portion of the airbag.

15. The vehicle as set forth in claim 11, further comprising a tether extending from the airbag to the seat bottom, the tether being fixed to a bottom half of the airbag in the inflated position.

16. The vehicle as set forth in claim 15, wherein the tether is fixed to the seat bottom at a location seat-rearward of a cross seat midline of the seat bottom.

17. The vehicle as set forth in claim 11, wherein the seat bottom has a top surface, and the second portion of the airbag includes a top surface lower than the top surface of the seat.

18. The vehicle as set forth in claim 11, wherein the first seat and the second seat are rotatably mounted to the floor.

19. The vehicle as set forth in claim 11, wherein:
the second seat includes a seat back and a seat bottom extending in a seat-forward direction from the seat bottom of the second seat;
the second seat includes an airbag mounted to the seat bottom of the second seat and inflatable from the seat bottom of the second seat to an inflated position between the first seat and the second seat; and
the airbag of the second seat in the inflated position includes a first portion extending in the seat-forward direction from the seat bottom of the second seat, a second portion extending from the first portion of the airbag of the second seat transverse to the first portion of the airbag of the second seat seat-forward of the seat bottom of the second seat, and a third portion extending from the second portion of the airbag of the second seat toward the seat bottom of the second seat.

20. A vehicle comprising:
a floor; and
a seat mounted to the floor;
the seat including a seat back and a seat bottom extending in a seat-forward direction from the seat bottom;
the seat including an airbag mounted to the seat bottom and inflatable from the seat bottom to an inflated position;
the airbag in the inflated position including a first portion extending in the seat-forward direction from the seat bottom, a second portion extending from the first portion transverse to the first portion seat-forward of the seat bottom, and a third portion extending from the second portion toward the seat bottom; and
the seat bottom having a top surface, and the second portion of the airbag including a top surface lower than the top surface of the airbag.

* * * * *